US007543188B2

(12) United States Patent
Devas et al.

(10) Patent No.: US 7,543,188 B2
(45) Date of Patent: Jun. 2, 2009

(54) BROWSER BASED REMOTE CONTROL OF FUNCTIONAL TESTING TOOL

(75) Inventors: Vivek Devas, Palo Alto, CA (US); Sripathi Viswanadhan, Sunnyvale, CA (US); Bruce Doty, Redwood City, CA (US)

(73) Assignee: Oracle International Corp., Redwood Shores, CA (US)

( * ) Notice: Subject to any disclaimer, the term of this patent is extended or adjusted under 35 U.S.C. 154(b) by 633 days.

(21) Appl. No.: 11/169,469

(22) Filed: Jun. 29, 2005

(65) Prior Publication Data

US 2007/0006036 A1 Jan. 4, 2007

(51) Int. Cl.
*G06F 11/00* (2006.01)

(52) U.S. Cl. ........................................................ 714/38

(58) Field of Classification Search .................... 714/38
See application file for complete search history.

(56) References Cited

U.S. PATENT DOCUMENTS 5,784,553 A * 7/1998 Kolawa et al. ................ 714/38
6,167,534 A * 12/2000 Straathof et al. .............. 714/38
6,182,245 B1 * 1/2001 Akin et al. .................... 714/38
6,185,701 B1 * 2/2001 Marullo et al. ................ 714/38
6,304,982 B1 * 10/2001 Mongan et al. ............... 714/38
6,356,946 B1 * 3/2002 Clegg et al. ................. 709/231
6,470,349 B1 * 10/2002 Heninger et al. ............ 707/102
6,523,137 B1 * 2/2003 Stone .......................... 714/38
6,542,845 B1 * 4/2003 Grucci et al. ............... 702/122
6,587,879 B1 * 7/2003 Reynolds .................... 709/224
6,895,539 B1 * 5/2005 Aragona ..................... 714/724
6,978,218 B1 * 12/2005 Kolb et al. .................. 702/122
7,017,149 B2 * 3/2006 Hanis ......................... 717/121
7,020,797 B2 * 3/2006 Patil ............................. 714/4
7,080,303 B2 * 7/2006 Bowers ...................... 714/741
7,089,249 B2 * 8/2006 Kobayashi et al. ............ 707/10
7,231,606 B2 * 6/2007 Miller et al. ................ 715/738
7,287,190 B2 * 10/2007 Rosenman et al. ............ 714/32
2001/0051919 A1 * 12/2001 Mason ........................ 705/40
2002/0184165 A1 * 12/2002 Deboer et al. .................. 706/1
2003/0004272 A1 * 1/2003 Power ........................ 525/192
2003/0041288 A1 * 2/2003 Kolawa et al. ................ 714/38
2003/0070120 A1 * 4/2003 Michael et al. ............... 714/38

(Continued)

FOREIGN PATENT DOCUMENTS

EP 28411 * 9/1988

OTHER PUBLICATIONS

David Flanagan, Java In A Nutshell, 2002, O'Reilly, 4th Edition, pp. 224 and 375.*

(Continued)

*Primary Examiner*—Robert Beausoliel
*Assistant Examiner*—Amine Riad
(74) *Attorney, Agent, or Firm*—Kraguljac & Kalnay, LLC

(57) ABSTRACT

Systems, methodologies, media, and other embodiments associated with browser based remote control of functional testing tools are described. One exemplary method embodiment includes receiving requests from a browser to control (e.g., start, stop) a functional testing tool. The example method may also include retrieving a test script to be an input for the functional testing tool and providing the test script to the functional testing tool. The example method is a server based method that resides logically between the browser and the functional testing tool.

22 Claims, 6 Drawing Sheets

U.S. PATENT DOCUMENTS

2003/0093717 A1* 5/2003 Mason ........................ 714/38
2003/0131285 A1* 7/2003 Beardsley et al. ............. 714/38
2003/0217308 A1* 11/2003 Volkov ........................ 714/38
2004/0003325 A1* 1/2004 Muller et al. ................. 714/38
2004/0054715 A1* 3/2004 Cesario ...................... 709/203
2004/0111727 A1* 6/2004 Schwarzbauer et al. ..... 719/310
2005/0246153 A1* 11/2005 Genkin et al. ................. 703/22
2006/0026464 A1* 2/2006 Atkin et al. ................... 714/38
2006/0248038 A1* 11/2006 Kaplan et al. .................. 707/1
2007/0113179 A1* 5/2007 Gibbs et al. ................. 715/530
2008/0072178 A1* 3/2008 Budzisch et al. ............ 715/853

OTHER PUBLICATIONS

Martin LaMonica, "Oracle goes 'grid' for app server", Aug. 20, 2003, CNET News.com.*

Mercury Interactive, Integrated Scripting Environment, WinRunner 6 Powerful Test Automation for the Enterprise, 1999, pp. 1-3, Mercury Interactive, Sunnyvale, CA.

* cited by examiner

BROWSER BASED REMOTE CONTROL OF FUNCTIONAL TESTING TOOL

BACKGROUND

The testing of software continues to evolve as a science. Originally there was no automated testing of software. Software was tested manually, usually by the developer, often using a hands-on trial and error process. Over time, some tools dubbed "record and replay" tools were developed. A user would typically sit at the computer on which a piece of software (e.g., application) was to be tested and manually run through a test. By monitoring the user interaction, a record tool captured the keystrokes, mouse clicks, voice commands, and so on that occurred during the test. The keystrokes and so on may have been stored in a file. Later, these recorded actions could be replayed to automatically test the software by recreating the keystrokes and so on that were performed during the live testing. To use this type of tool, the tester typically required direct physical access to the computer on which the software was being tested, both during the record and test phase. This limited the testing. Additionally, the recorded keystrokes and so on may have had to be stored on the computer on which the software was being tested, further limiting the testing.

While the initial record and replay tools were an improvement over hands-on manual testing, further developments continued. For example, client/server based record and replay tools were developed. In these tools, an application to be tested and the test tool could be located on different computers. A tester would access a server that hosted the test tool and also access a client upon which the application to be tested was located. Recorded keystrokes and so on may have been stored in a file on a file system on either the server or the client. Direct, dedicated connections between client and server coupled with file system based storage of recorded keystrokes and so on characterized this next generation of tools.

BRIEF DESCRIPTION OF THE DRAWINGS

The accompanying drawings, which are incorporated in and constitute a part of the specification, illustrate various example systems, methods, and so on that illustrate various example embodiments of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Of course, embodiments and/or elements can be combined with other embodiments to produce variations of the systems and methods, and their equivalents.

DETAILED DESCRIPTION

Figure 1:
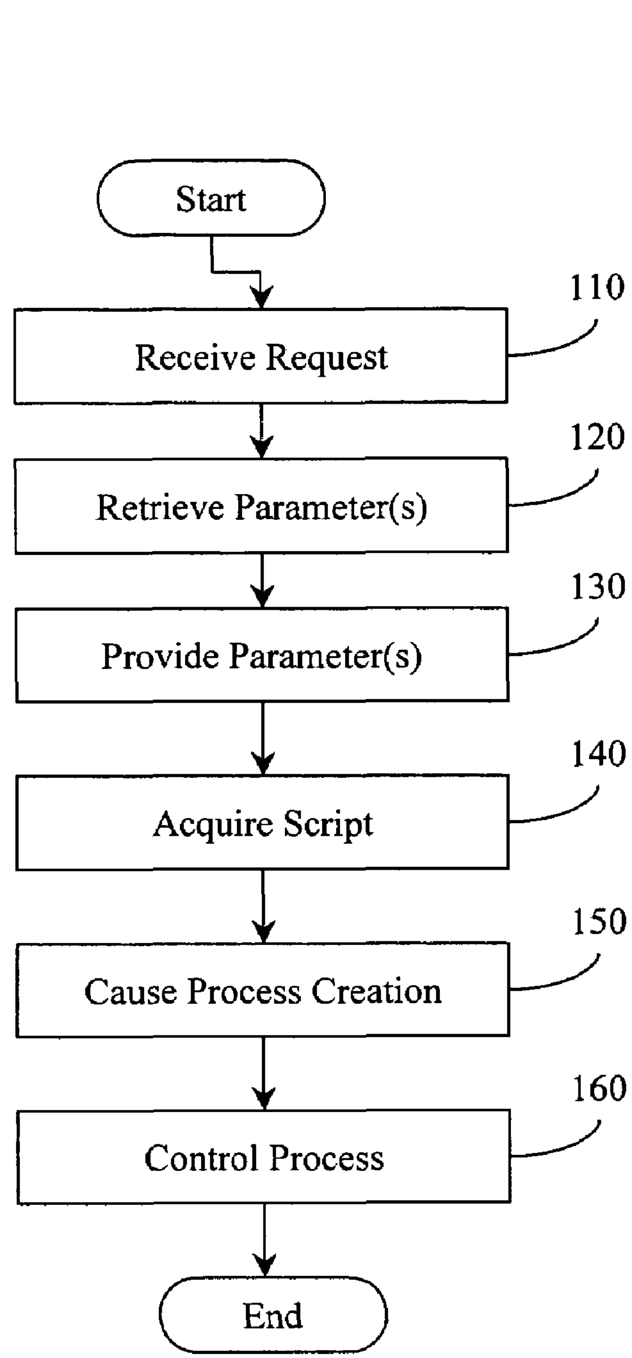
FIG. 1 illustrates an example method associated with browser based remote control of a functional testing tool.

Example systems and methods facilitate browser based remote control of a functional testing tool. Browsers like Internet Explorer, Mozilla, Navigator, and so on that run on a first computer may be configured to communicate, directly and/or indirectly, with a servlet associated with a server on a second computer. The communication may be, for example, a computer communication as that term is defined herein. The servlet may in turn be configured to control (e.g., run, monitor, terminate) a functional testing tool like a record and replay tool. The servlet may be configured to access a repository like a database in which test scripts associated with the functional testing tool may be located. Rather than being stored as files, the test scripts may be stored, for example, as binary large objects (BLOBs) with which metadata has been associated. Thus, the test scripts may be searchable and otherwise manipulated. Therefore, the browser may be configured to request from and the servlet may be configured to retrieve from the repository a specific test script and/or set of scripts that match certain criteria communicated from the browser to the servlet. After running a test tool using the retrieved test script, the servlet may store test results and/or report test results back to the browser.

In one example, systems and methods may facilitate controlling (e.g., invoking, terminating, monitoring) an enterprise functional testing tool like a record and replay tool located on a local machine like a personal computer on which software like a business application is to be tested. The control may be exercised from a browser that is running on a computer like a personal computer that is configured to communicate with a server that logically resides between the browser and the software to be tested. The enterprise functional testing tool may be invoked by a servlet associated with the server. In different examples, the server may reside on the remote machine and/or on an intermediate machine located between the local computer and the remote computer. Thus, the server may include a servlet runner that is configured to communicate on one side with applications like browsers and on another side with servlets. The servlet runner may be configured to listen on servlet ports for communications from a browser and to selectively communicate with servlets based on data received from the browser in certain HTTP (Hyper Text Transfer Protocol) methods.

The server may be configured to receive a request in the form of an HTTP method (e.g., GET, POST) from the web browser through a Java Server Page (JSP). JSP technology facilitates creating web pages that display dynamically generated content. The JSP specification defines interactions between a server and a JSP page, describing, for example, the format and syntax of a page. The HTTP method may include parameters to pass to the servlet. One parameter may describe a user-selectable script stored as a BLOB in a repository like a database. Thus the servlet may download the script from the repository and cause the enterprise functional testing tool to run using the downloaded script. Another parameter may describe, for example, an application to be tested by the functional testing tool.

The servlet may be configured to wait for the testing tool to complete its run and then to write results to a results repository like a test result database. In one example, the test result database may be located in the same data store as the scripts are stored. In another example, the test results may be stored in a data store separate from where the scripts are stored. In one example, the browser may subsequently provide an HTTP method that specifies that the testing tool is to be terminated. Thus, the servlet may be configured to use a keyboard interface tool like a "pushkeys" utility to terminate the testing tool. For example, if a "control-k" sequence will kill a testing tool process started by the servlet, then those keystrokes may be sent to the testing tool using the utility. The utility may be located, for example, in an operating system on the computer on which the functional testing tool and/or the application to be tested are running.

In one example, the "front end" of a configuration that facilitates browser based remote control of a functional testing tool may include a browser like Internet Explorer and JSPs. The "middle tier" of the configuration may include a web server like an Oracle 9iAS Web Server. The "back end" of the configuration may include an application server like an Oracle 9iAS Application Server and a database like an Oracle 9i Database. The functional testing tool may be, for example, WinRunner®, an application provided by Mercury Interactive. Thus, test scripts may be stored in the database as a BLOB datatype. The middle tier may include a computer that may be referred to generically as a "test tool server" or more specifically as a "WinRunner® Server" and that may be configured with the test tool software as well as the web server. The web server may be configured with a servlet runner. While Oracle servers and databases are described, and while the WinRunner® application is described, it is to be appreciated that other servers and functional test tools may be employed.

The following includes definitions of selected terms employed herein. The definitions include various examples and/or forms of components that fall within the scope of a term and that may be used for implementation. The examples are not intended to be limiting. Both singular and plural forms of terms may be within the definitions even when only a singular term is used.

"Applet", as used herein, refers to a program that is intended to be executed from within another application. For example, an applet may run in a web browser and perform actions it requests through a specific interface. In this case, the web browser is the application in which the applet runs. Unlike an application, an applet can not typically be executed directly from an operating system.

"Application", as used herein, refers to a set of related computer-executable instructions that may be executed on a computer to achieve a defined goal. An application may be a stand-alone application, a distributed application, a client-server application, and so on. An operating system is not an application in the context of this patent application. An application may have interface logic and business logic that may be distributed on different computers.

"BLOB", as used herein, refers to a binary large object. A BLOB may include a collection of binary data that is stored as a single entity in a data store like a database. BLOBs typically store multimedia objects like images, and so on. However, BLOBs may be used to store other things like programs, code fragments, and, in this case, test scripts that may include recorded keystrokes, mouse clicks, voice commands, and so on. A BLOB may also be configured with metadata (data about data) that facilitates actions like searching for a BLOB, manipulating data in a BLOB, and so on. The metadata may include, for example, the date on which the data was created, who created the data, an application for which the data is intended to be used, an application for which the data should not be used, and so on.

"Computer component," as used herein, refers to a computer-related entity like hardware, firmware, software, software in execution, and/or a combination thereof. For example, a computer component can be, but is not limited to being, a process running on a processor, a processor, an object, an executable, a thread of execution, a program, and a computer. By way of illustration, both an application running on a server and the server can be computer components. One or more computer components can reside within a process and/or thread of execution and a computer component can be localized on one computer and/or distributed between two or more computers.

"Computer communication", as used herein, refers to a communication between two or more computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on.

"Computer-readable medium", as used herein, refers to a medium that participates in directly or indirectly providing signals, instructions and/or data. A computer-readable medium may take forms, including, but not limited to, non-volatile media, volatile media, and transmission media. Non-volatile media may include, for example, optical or magnetic disks and so on. Volatile media may include, for example, optical or magnetic disks, dynamic memory and the like. Transmission media may include coaxial cables, copper wire, fiber optic cables, and the like. Transmission media can also take the form of electromagnetic radiation, like that generated during radio-wave and infra-red data communications, or take the form of one or more groups of signals. Common forms of a computer-readable medium include, but are not limited to, a floppy disk, a flexible disk, a hard disk, a magnetic tape, other magnetic medium, a CD-ROM, other optical medium, punch cards, paper tape, other physical medium with patterns of holes, a random access memory (RAM), a read only memory (ROM), an electrically programmable ROM (EPROM), a FLASH-EPROM, or other memory chip or card, a memory stick, a carrier wave/pulse, and other media from which a computer, a processor or other electronic device can read. Signals used to propagate signals, instructions, data, or other software over a network, like the Internet, can be considered a "computer-readable medium."

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Functional testing tool", as used herein, refers to an application that may capture, verify, and/or replay user interactions automatically. A functional testing tool facilitates repeatable, automated testing (e.g., regression testing) of software. In one example, a functional testing tool may be an enterprise functional testing tool that facilitates testing enterprise applications. One class of functional testing tools is known as "record and replay" tools. User interactions with an application are recorded during the "record" phase and then subsequently provided to the application again during the "replay" phase. A functional test tool may facilitate recording into test scripts business processes like making hotel reservations, ordering a book, balancing a network load, and so on. To create a test script, a functional test tool may observe and record a business process. Then, the functional testing tool may automatically provide the actions (e.g., keystrokes, mouse clicks, voice commands) observed during the recording to the software to be tested to simulate a user providing those actions. The actions may be associated with business logic (e.g., making a choice) and/or data entry (e.g., providing a quantity for an order). Thus, a test script may be able to distinguish between data associated with these different possibilities. Metadata associated with a BLOB in which a test script may be stored may facilitate distinguishing between business logic related data in a script and data entry data associated with a script.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device like a field programmable gate array (FPGA), a memory device containing instructions, combinations of logic devices, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, logic, software, or so on. In the context of a network connection, an operable connection may be created though a computing device(s) and/or network component(s). Logical and/or physical communication channels can be used to create an operable connection.

"Servlet", as used herein, refers to a software component that can be associated with (e.g., "plugged in") to a server to provide additional services. The server may be, for example, a Java-enabled web server. Servlets are designed to work with a request/response processing model wherein a client may send a request to a server and expect back a reply from the server. The requests may be, for example, HTTP methods, URLs, and so on. Since the servlets plug-in to an existing server, the server is typically tasked with handling network connections, protocol negotiation, class loading, and so on and the servlet is typically tasked with some specific, additional task. In this application, the additional task may be invoking and/or controlling a functional test tool. A servlet is not run or executed in the same sense as an application or applet. Rather, a servlet may be seen as providing a functionality that extends a server. In different examples, servlets may be started/stopped per client and/or request and/or servlets may be started contemporaneously with the server into which they have been plugged and kept alive until that server is shut down. From one point of view, a servlet is to a web server as an applet is to a web browser. A servlet may have a servlet application programming interface (API) through which the server and the servlet communicate. API methods may include lifecycle methods, configuration methods, control methods, and so on. A servlet lifecycle is different from a traditional application lifecycle. A servlet runs on a web server platform as part of the same process as the web server itself. Thus, the web server is responsible for life cycle actions like initializing, invoking, and destroying servlet instances.

A "server", as used herein, refers to a computer component configured to perform a defined function. While a server may include both hardware and software, as used herein, server typically refers to software configured to perform a defined function. For example, the term "web server" refers to software configured to provide web services rather than the machine (e.g., computer) upon which the web server runs. As described above, the functionality of a server may be extended by the addition of a servlet. Thus, a server may include a "servlet runner". A servlet runner may be configured to control (e.g., load, start, stop, unload) servlets. A servlet runner may also be configured to listen at servlet ports and to selectively communicate with a servlet. One example servlet runner is provided by an Apache Web Server.

"Signal", as used herein, includes but is not limited to one or more electrical or optical signals, analog or digital signals, a bit or bit stream, and/or other means that can be received, transmitted and/or detected. A signal can also take other forms like data, one or more computer or processor instructions, messages, and the like.

"Software", as used herein, includes but is not limited to, one or more related computer or processor instructions that can be read, interpreted, compiled, and/or executed and that cause a computer, processor, or other electronic device to perform functions, actions and/or behave in a desired manner. The instructions may be embodied in various forms like routines, modules, methods, threads, and/or programs including separate applications, code from dynamically linked libraries, code in objects, and so on. Software may also be implemented in a variety of executable and/or loadable forms including, but not limited to, a stand-alone program, a function call (local and/or remote), a servlet, an applet, instructions stored in a memory, part of an operating system, part of an object, or other types of executable instructions. It will be appreciated by one of ordinary skill in the art that the form of software may depend, for example, on requirements of a desired application, on the environment in which it runs, and/or on the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

Suitable software for implementing the various components of the example systems and methods described herein include programming languages and tools like Java, C#, C++, and/or other languages and tools. Software, whether an entire system or a component of a system, may be embodied as an article of manufacture and maintained or provided as part of a computer-readable medium as defined previously. Another form of the software may include signals that transmit program code of the software to a recipient over a network or other communication medium. Thus, in one example, a computer-readable medium has a form of signals that represent the software/firmware as it is downloaded from a server to a user. In another example, the computer-readable medium has a form of the software/firmware as it is maintained on the server. Other forms may also be used.

"User", as used herein, includes but is not limited to one or more persons, software, computers, other devices, and/or combinations of these.

Some portions of the detailed descriptions that follow are presented in terms of methods, algorithms, and/or symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, intercepting, storing, redirecting, detecting, determining, displaying, or the like, refer to actions and processes of a computer system, logic, processor, or similar electronic device that manipulates and/or transforms data represented as physical (electronic) quantities.

FIG. 1 illustrates an example computer-implemented method 100 that is associated with browser based remote control of a functional testing tool. In one example, the remote control executed may simply include requesting the initiation of and/or termination of a test. Method 100 will be performed in a server. A user may wish to test an application on a remote machine or a set of remote machines. Rather than physically walking around and sitting down at each remote computer and manually testing each piece of software, the user may interact with a method like method 100 that runs on a server. Once again, rather than walking around and sitting down at the server, the user may access method 100 from a remote machine using a browser. The browser may be, for example, Internet Explorer, Navigator, and the like. The browser may communicate with the server using a protocol like HTTP. Thus, the user may cause HTTP methods (e.g., POST, GET) to be provided to method 100. In one example, the HTTP methods may be sent to method 100 via a JSP associated with the browser. While a browser is described, it is to be appreciated that other applications that may provide HTTP methods via entities like a JSP may also be employed to communicate with method 100.

Method 100 may include, at 110, receiving from a client a request to run a functional testing tool against an application to be tested. As described above, the request may come in the form of an HTTP method like a POST method. While a POST method is described, it is to be appreciated that other HTTP methods may be employed. Furthermore, while HTTP is described as the protocol between the client and method 100, it is to be appreciated that method 100 may be configured to receive messages associated with other protocols. In one example, the request may be received from a browser via a JSP associated with the client. The functional testing tool may be, for example, a record and replay tool. In one example, the browser and the server in which method 100 will run may be located on separate computers. However, this is not a requirement and in another example, the browser and the server in which method 100 will run may be located on the same computer. Thus, when the browser and the server in which method 100 will run are described as local and remote, the distinction is a logical distinction, which may be implemented by physical separation.

Method 100 may also include, at 120, retrieving a parameter(s) from the request. The parameters may be configured to facilitate identifying things like a test script to be used with the functional testing tool, a data store from which the test script may be retrieved, an application to be tested by the functional testing tool, and so on. As will be described below, a test script may be stored as a BLOB with associated metadata. Thus, the parameters may include, for example, search criteria to be applied to a set of stored BLOBs. The metadata associated with the BLOBs may facilitate determining whether the criteria have been satisfied and thus whether a script(s) should be retrieved for use with a functional test tool run against an application. Note that the parameters may also include data concerning a data store from which a test script (s) is to be retrieved. This illustrates that not only can the browser, the server, the test tool, and the application be stored remotely (physically and/or logically) from each other, but so can the test scripts to be employed by the test tool. Thus, limitations associated with co-residency requirements in conventional tools are mitigated by example systems and methods described herein.

Method 100 may also include, at 130, providing a parameter(s) to a servlet that is configured to control the functional testing tool. In one example, the parameter(s) may need to be translated and/or manipulated from an HTTP format to a command line format associated with the functional testing tool. While HTTP format and test tool format are described, it is to be appreciated that other formats and thus other translations may be employed. As described above, servlets are associated with servers and in effect become part of the server, providing additional functionality. In this case, the servlet is adding the functionality of interacting with a functional test tool. Since the functional test tool may be configurable based on inputs, method 100 facilitates providing an input to the test tool through the servlet. The input may be, for example, the name of a software application to test, a machine on which the test should be run, and so on. The input may also be a test script to be applied against the application. Thus, the test script(s) described by the parameter(s) provided to method 100 may in turn be provided to the test tool.

Therefore, method 100 may also include, at 140, selectively acquiring a test script. The test script may be configured to facilitate customizing an operation of the functional testing tool. In one example, the test script will be acquired by the servlet. In one example, the test script may be stored as a BLOB in a database and the BLOB may include metadata that is configured to facilitate interacting with the BLOB. For example, the metadata may facilitate selecting a test script based on data provided in the parameter(s) that were supplied to method 100 by the request to run the test tool. By way of illustration, a parameter may have indicated that test scripts that include keystrokes and mouse clicks but that do not include voice commands are to be retrieved. By way of further illustration, a parameter may have indicated that test scripts that are relevant to a certain application are to be retrieved.

In one example, after a test script is acquired by the servlet it may be manipulated and provided to a data store. The data store may be associated with, for example, the functional testing tool, the application to be tested, the server, and so on. In this case, "associated with" may include, for example, being part of a computer on which the tool or application will run. The providing may be accomplished, for example, by a computer communication. Providing the test script facilitates reducing, for example, network traffic. Rather than continuously supplying keystroke information and the like across a network, the test script may be downloaded to a computer on which the test tool will run and/or a computer on which the application to be tested will run.

The script as retrieved from the data store may need to be manipulated before it is provided to a data store. By way of illustration, metadata may need to be stripped from the script. By way of further illustration, values may need to be provided for variables in a test script. For example, the test script may include a variable for the number of times the sequence of keystrokes, mouse clicks, voice commands, and other actions in the script are to be repeated. In another example, the test script may include a variable describing a timeout value to be employed. In yet another example, the test script may include another variable associated with localization like the time zone in which results are to be reported. While three variables are described, it is to be appreciated that other types and amounts of variables may be employed.

Method 100 may also include, at 150, causing a functional testing tool process to be created. The process may be created, for example, on a computer on which the functional test tool will run. Thus, causing the process to be created may include, for example, interacting with an operating system on the machine on which the functional test tool will run.

The process may be configured to functionally test the application. Thus, the process may be an instance of the functional test tool in execution. The servlet may cause the process to be created. In one example, the server may invoke a servlet method via a servlet API. The servlet may be, for example, a JAVA servlet. Thus, in one example, the functional testing tool process may be created in response to the servlet issuing an exec( ) instruction. An exec( ) instruction may take the form exec("string"), where the string is passed to an operating system. For example, a string like "C:\wrun.exe" may be passed to an operating system to cause an executable (wrun.exe) to be run. While an exec( ) instruction is described, it is to be appreciated that in other examples the servlet may communicate with an operating system or other process creator using other approaches. As used herein, exec( ), service ( ), and the like refer to JAVA methods. One skilled in the art will appreciate that the ( ) are employed to identify a method and are not a required syntactic element.

Method 100 may also include, at 160, selectively controlling the functional testing tool process. This control may be executed, for example, by the servlet. Controlling the process may include, for example, monitoring ongoing results, pausing the process, halting the process, and so on. In one example, selectively controlling the functional testing tool process includes having the server call a service( ) method associated with the servlet.

Method 100 may also include, not illustrated, selectively providing a result related to the functional testing tool process upon detecting the completion of the functional testing tool process. In one example, the completion may be detected by the servlet. For example, the operating system associated with the process may send a signal back to the servlet. The servlet may provide a result related to the functional testing tool process. In one example, the result may include providing a BLOB to a results data store.

Method 100 may also include, not illustrated, configuring the server with a servlet runner. The servlet runner may be configured to listen for the request at a servlet port. In one example, the request may be a request to use a servlet like the servlet that controls the functional test tool process. Since the server may be configured to load a servlet upon request, the servlet runner may be configured to selectively load a servlet in response to detecting a request. One example servlet runner may be an Apache servlet runner.

Method 100 may also include, not illustrated, causing the functional testing tool process to be terminated. The termination may be initiated in response to receiving, for example, an additional HTTP method from the client. The method may be configured to terminate the functional testing tool process. The termination may be effected, for example, by providing keystrokes to the functional testing tool process via a keystroke interface. The keystroke interface may be provided by an operating system associated with the functional testing tool process. In one example, the keystroke interface may be the pushkeys utility associated with an operating system supporting the functional test tool process and/or the application being tested.

While FIG. 1 illustrates various actions occurring in serial, it is to be appreciated that various actions illustrated in FIG. 1 could occur substantially in parallel. By way of illustration, a first process could receive communications from a client and manipulate parameters in the communications, a second process could provide parameters to a servlet, a third process could retrieve and manipulate a test script, and a fourth process could initiate and control a test tool process. While four processes are described, it is to be appreciated that a greater and/or lesser number of processes could be employed and that lightweight processes, regular processes, threads, and other approaches could be employed.

In one example, methodologies are implemented as processor executable instructions and/or operations stored on a computer-readable medium. Thus, in one example, a computer-readable medium may store processor executable instructions that are operable to perform in a server a method that includes receiving a request from a client to run a functional testing tool. The request may take the form of an HTTP method. The method may also include retrieving a parameter (s) from the request. The parameter(s) may facilitate identifying a test script associated with the functional testing tool, a data store from which the test script may be retrieved, an application to be tested by the functional testing tool, and the like. The method may also include providing a parameter(s) to a servlet for controlling the functional testing tool. The method may also include having the servlet selectively acquire a test script for customizing an operation of the functional testing tool. The method may also include having the servlet cause a functional testing tool process to be created. The process will be used to functionally test the application. The method may also include having the servlet selectively control the functional testing tool process. The method may also include, upon the servlet detecting the completion of the functional testing tool process, selectively providing a result related to the functional testing tool process.

While the above method is described being stored on a computer-readable medium, it is to be appreciated that other example methods described herein can also be stored on a computer-readable medium.

Figure 2:
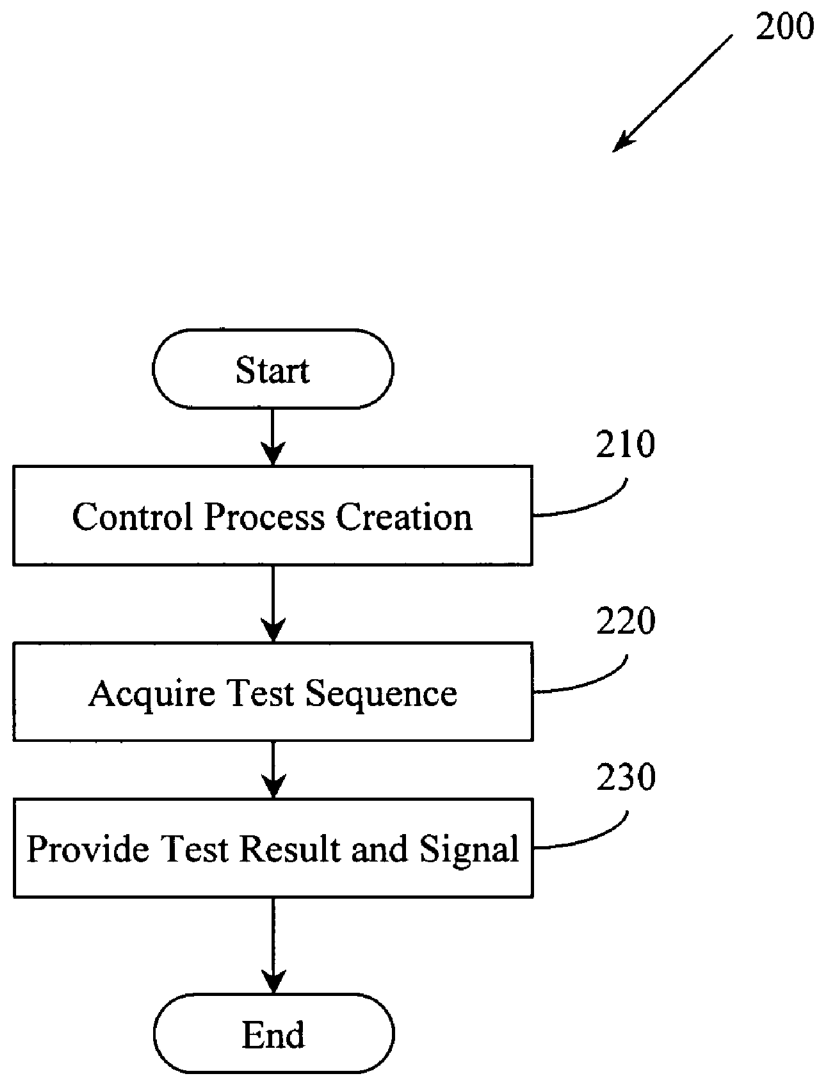
FIG. 2 illustrates an example method associated with browser based remote control of a functional testing tool.

FIG. 2 illustrates an example computer-executable method 200 that is associated with browser based remote control of a functional testing tool. Method 200 may be performed in a server. In one example, portions of method 200 may be performed by a server while other portions may be performed by a servlet associated with the server.

Method 200 may include, at 210, selectively controlling the creation of a functional testing tool process in response to receiving a signal from a browser. The process may be created on a first computer that is remote from a second computer on which the browser is running.

Method 200 may also include, at 220, selectively acquiring from a third computer a test sequence to provide to the functional testing tool process. Which test sequence is acquired and from where it is acquired may be based, at least in part, on a parameter associated with the signal. For example, the parameter may specify a script name, a script type, a script location, and so on.

Method 200 may also include, at 230, providing to the third computer a test result and/or providing to the browser a signal noting the completion of the test process. The result and/or the signal may be provided, for example, in response to detecting the completion of the functional testing tool process.

Figure 3:
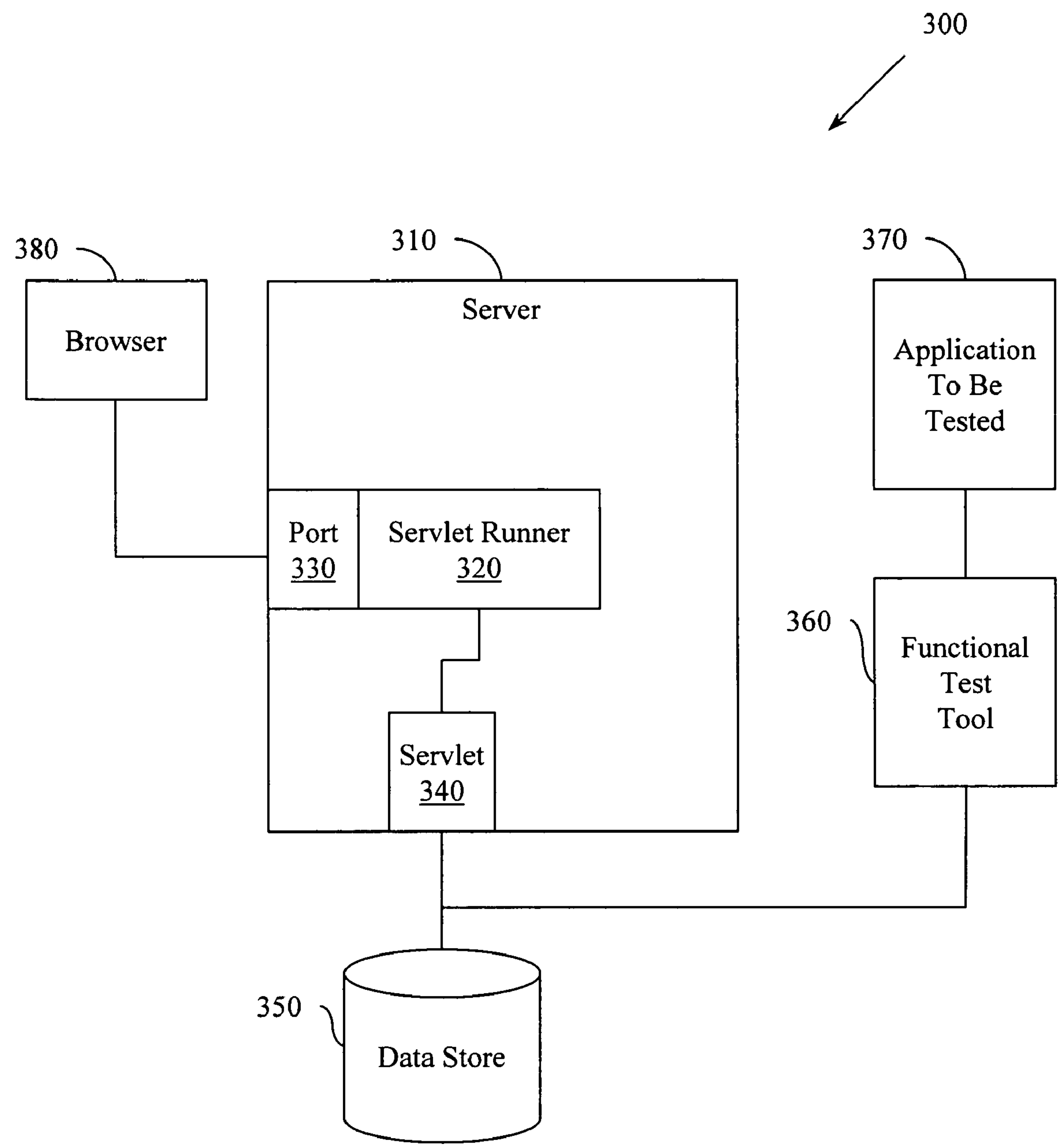
FIG. 3 illustrates an example system associated with browser based remote control of a functional testing tool.

FIG. 3 illustrates an example system 300 that is associated with browser based remote control of a functional testing tool. System 300 may include a server 310. Server 310 may be located, for example, on a first computer. In one example, server 310 may be an Oracle Web Server. From one point of view, server 310 may be considered to be a physical combination of hardware and software. From another point of view, server 310 may be considered to be a logical combination of software in execution. In one example, server 310 may be configured to communicate with a browser 380. Browser 380 may be configured to provide HTTP methods to server 310. In one example, browser 380 may provide the HTTP methods from a JSP web page (not illustrated).

Thus, system 300 may also include a servlet runner 320 that is configured to listen at a servlet port(s) 330 for an HTTP method. The HTTP method may, for example, request that a functional test tool 360 be run against an application 370 located on a second computer.

System 300 may also include a servlet 340 that is configured to cause the functional test tool 360 to run. In one example, servlet 340 may be a Java servlet. Servlet 340 may be configured to selectively acquire an input data to provide to functional test tool 360. Which input data is to be acquired and from where it is to be acquired may be based, at least in part, on a parameter(s) provided in the HTTP method.

System 300 may also include a data store 350 that is configured to store input datas. The input datas may, for example, be collections of keystrokes, mouse clicks, and other interface interaction data. The input datas may be provided to facilitate controlling, at least in part, the functional test tool 360. For example, the functional test tool 360 may be configured to test the application to be tested 370 by providing simulated sequences of keystrokes, mouse clicks, voice commands, and other inputs. In one example, the input datas may be stored as BLOBs in an Oracle database.

In one example, system 300 may also include, not illustrated, a second data store that is configured to store a result produced by functional testing tool 360 and/or servlet 340. The result may be stored, for example, as a BLOB.

Figure 4:
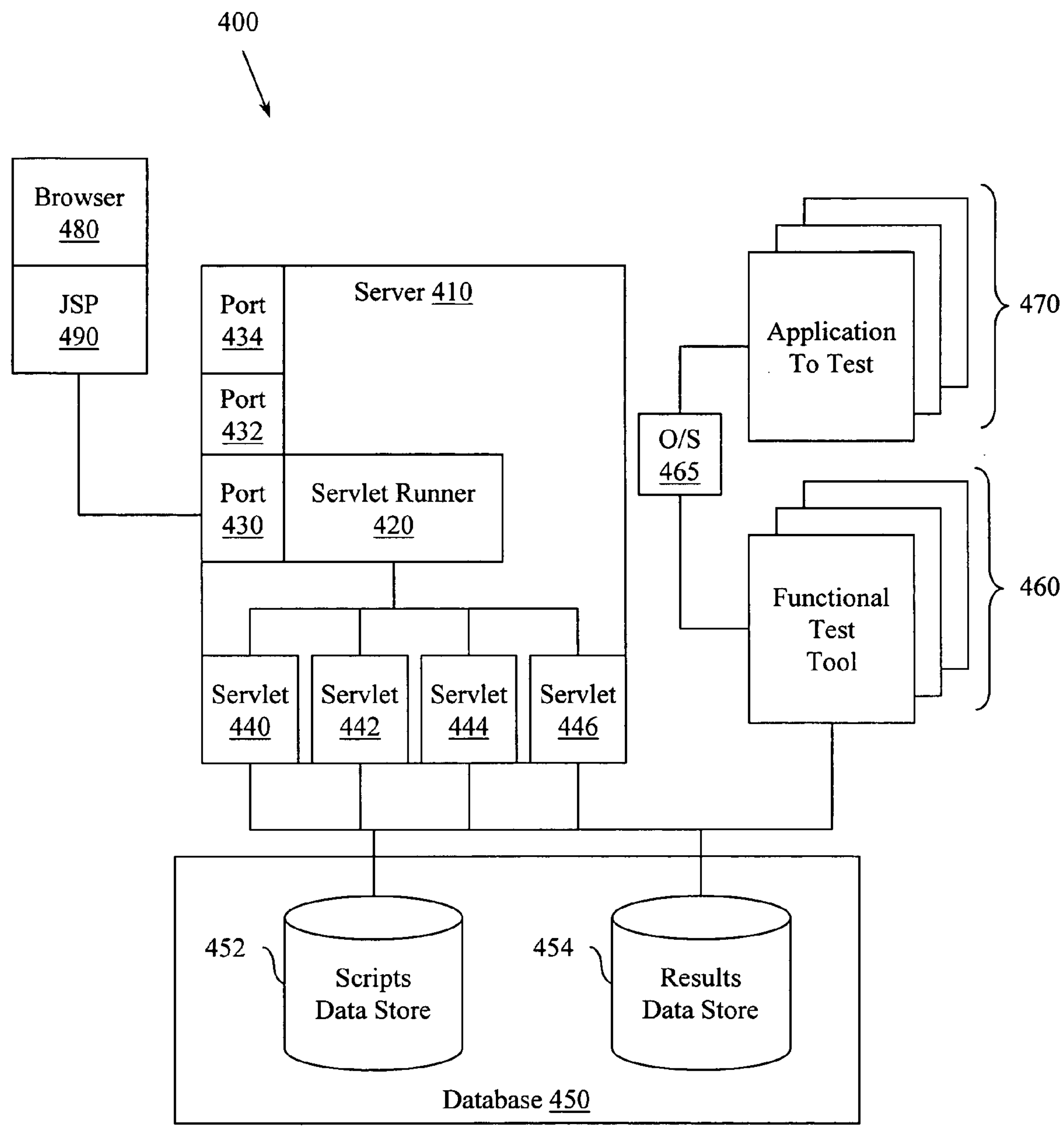
FIG. 4 illustrates an example system associated with browser based remote control of a functional testing tool.

FIG. 4 illustrates an example system 400 that is associated with browser based remote control of a functional testing tool. System 400 includes a server 410 like server 310 (FIG. 3) and a servlet runner 420 like servlet runner 320 (FIG. 3). Server 400 interacts with a browser 480 like browser 380 (FIG. 3).

While server 310 (FIG. 3) illustrates a single servlet 340, server 410 illustrates multiple servlets 440, 442, 444, and 446. While four servlets are illustrated, it is to be appreciated that server 410 may include a greater and/or lesser number of servlets. Servlets may be tasked with controlling different instances of a functional test tool 460. Thus servlets may be associated with different applications to test 470. Since some applications 470 may interact with other applications 470, and since a user may wish to test the interaction of these applications, different servlets may communicate and/or cooperate to control different instances of functional test tool 460.

While server 310 (FIG. 3) illustrates a single port 330 (FIG. 3), server 410 illustrates multiple ports 430, 432, and 434. While three ports are illustrated, it is to be appreciated that server 410 may include a greater and/or lesser number of ports. With multiple ports available in server 410, servlet runner 420 may be configured to listen on multiple ports and thus to facilitate communications with multiple servlets. FIG. 4 illustrates a single browser 480 interacting with port 430 through a JSP 490. However, in different examples, multiple browsers may interact with ports 430 through 434 through multiple JSPs.

While FIG. 3 illustrated a single data store 350 in which test scripts may be stored, FIG. 4 illustrates a database 450 distributed across multiple data stores 452 and 454. Data store 452 may be configured to store test scripts while data store 454 may be configured to store results. The scripts and/or the results may be stored as BLOBs. While two data stores are illustrated, it is to be appreciated that database 450 may be distributed between a greater and/or lesser number of data stores.

FIG. 4 illustrates an operating system 465 with which instances of functional test tool 460 and/or instances of application to be tested 470 may interact. Interacting with the operating system may include, for example, being created (e.g., spawned) by the operating system, being controlled (e.g., halted, resumed) by operating system 465, being terminated (e.g., killed) by operating system 465, and the like. Furthermore, operating system 465 may provide a keyboard/mouse interface like a pushkeys utility for providing keystrokes to an application 470 and/or test tool 460.

Figure 5:
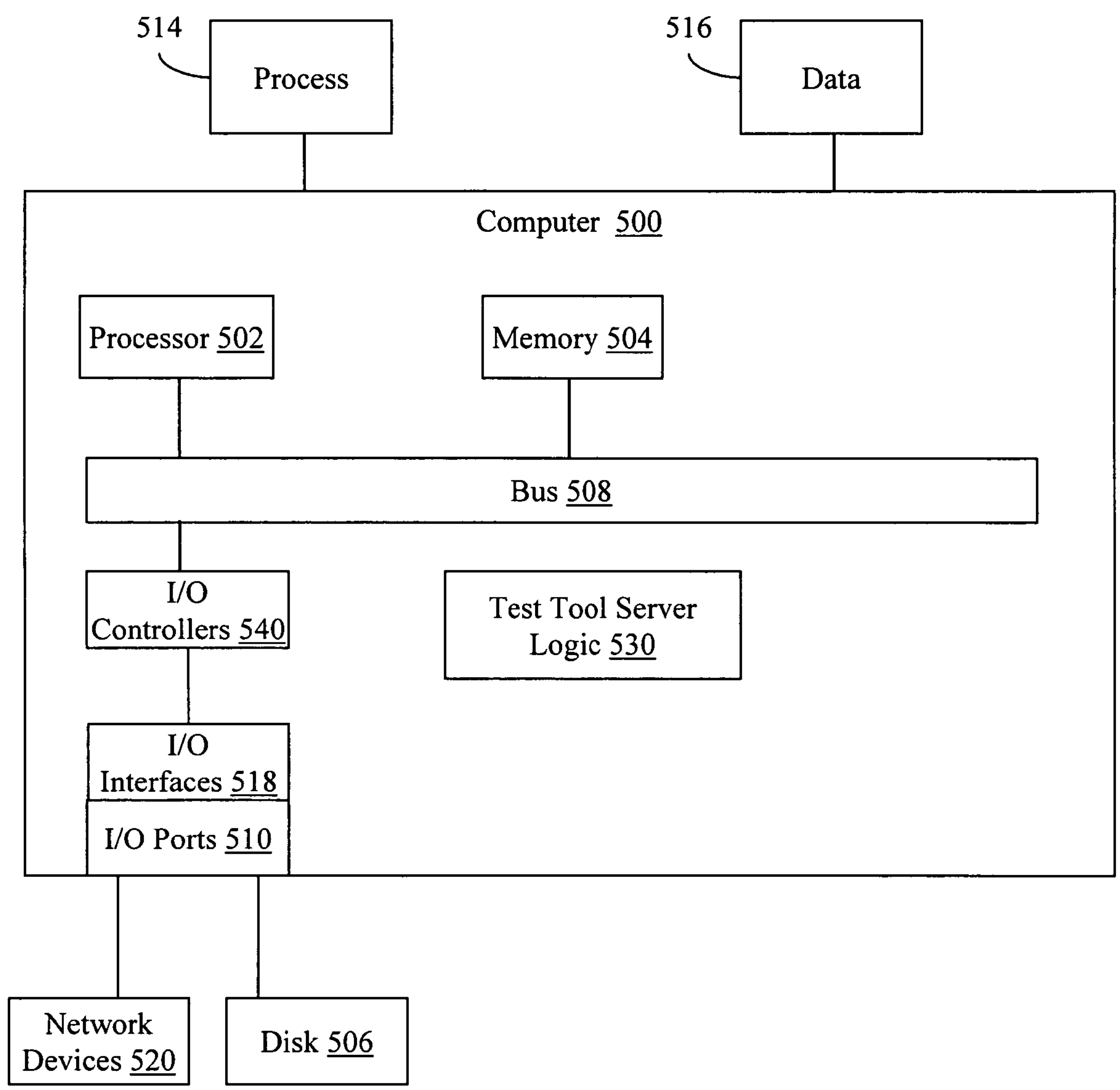
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, the computer 500 may include a test tool server logic 530 that is configured to facilitate browser based control of a functional testing tool. The test tool server logic 530 may implement example systems and methods described herein. For example, the test tool server logic 530 may be a pluggable chip that can be added to computer 500 to reconfigure computer 500 as a server that sits between a browser and a functional testing tool.

In one example, test tool server logic 530, whether implemented in hardware, software, and/or firmware may provide means (e.g., hardware, software) for selectively controlling the creation of a functional testing tool process to test software (e.g., an application) on a remote machine. Remote, in this context, refers to physical and/or logical separation of an invoking entity like a browser and a target entity like software to be tested. Test tool server logic 530 may also provide means (e.g., hardware, software) for storing a script configured to facilitate customizing the operation of the functional testing tool with the software. Test tool server logic 530 may also provide means (e.g., hardware, software) for selectively acquiring the script from the data store. While illustrated as a single logic, it is to be appreciated that logic 530 may be distributed between two or more logics and/or may be replicated in, for example, memory 504, disk 506, and so on.

Generally describing an example configuration of the computer 500, the processor 502 can be a variety of various processors including dual microprocessor and other multiprocessor architectures. The memory 504 can include volatile memory and/or non-volatile memory. The non-volatile memory can include, but is not limited to, read only memory (ROM), programmable ROM (PROM), erasable PROM (EPROM), and the like. Volatile memory can include, for example, random access memory (RAM), synchronous RAM (SRAM), dynamic RAM (DRAM), synchronous DRAM (SDRAM), double data rate SDRAM (DDR SDRAM), and direct RAM bus RAM (DRRAM).

A disk 506 may be operably connected to the computer 500 via, for example, an input/output interface (e.g., card, device) 518 and an input/output port 510. The disk 506 can include, but is not limited to, devices like a magnetic disk drive, a solid state disk drive, a floppy disk drive, a tape drive, a Zip drive, a flash memory card, and/or a memory stick. Furthermore, the disk 506 can include optical drives like a compact disk ROM (CD-ROM), a CD recordable drive (CD-R drive), a CD rewriteable drive (CD-RW drive), and/or a digital video ROM drive (DVD ROM). The memory 504 can store processes 514 and/or data 516, for example. The disk 506 and/or memory 504 can store an operating system that controls and allocates resources of the computer 500.

The bus 508 can be a single internal bus interconnect architecture and/or other bus or mesh architectures. While a single bus is illustrated, it is to be appreciated that computer 500 may communicate with various devices, logics, and peripherals using other busses that are not illustrated (e.g., PCIE, SATA, Infiniband, 1394, USB, Ethernet). The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 500 may interact with input/output devices via input/output (I/O) interfaces 518 and I/O ports 510. I/O devices can include, but are not limited to, a keyboard, a microphone, a pointing and selection device, cameras, video cards, displays, disk 506, network devices 520, and the like. The I/O ports 510 can include but are not limited to, serial ports, parallel ports, and USB ports.

The computer 500 can operate in a network environment and thus may be connected to network devices 520 via the I/O devices 518, and/or the I/O ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and the like. Similarly, the network devices 520 can connect to WAN technologies including, but not limited to, point to point links, circuit switching networks like integrated services digital networks (ISDN), packet switching networks, and digital subscriber lines (DSL).

Figure 6:
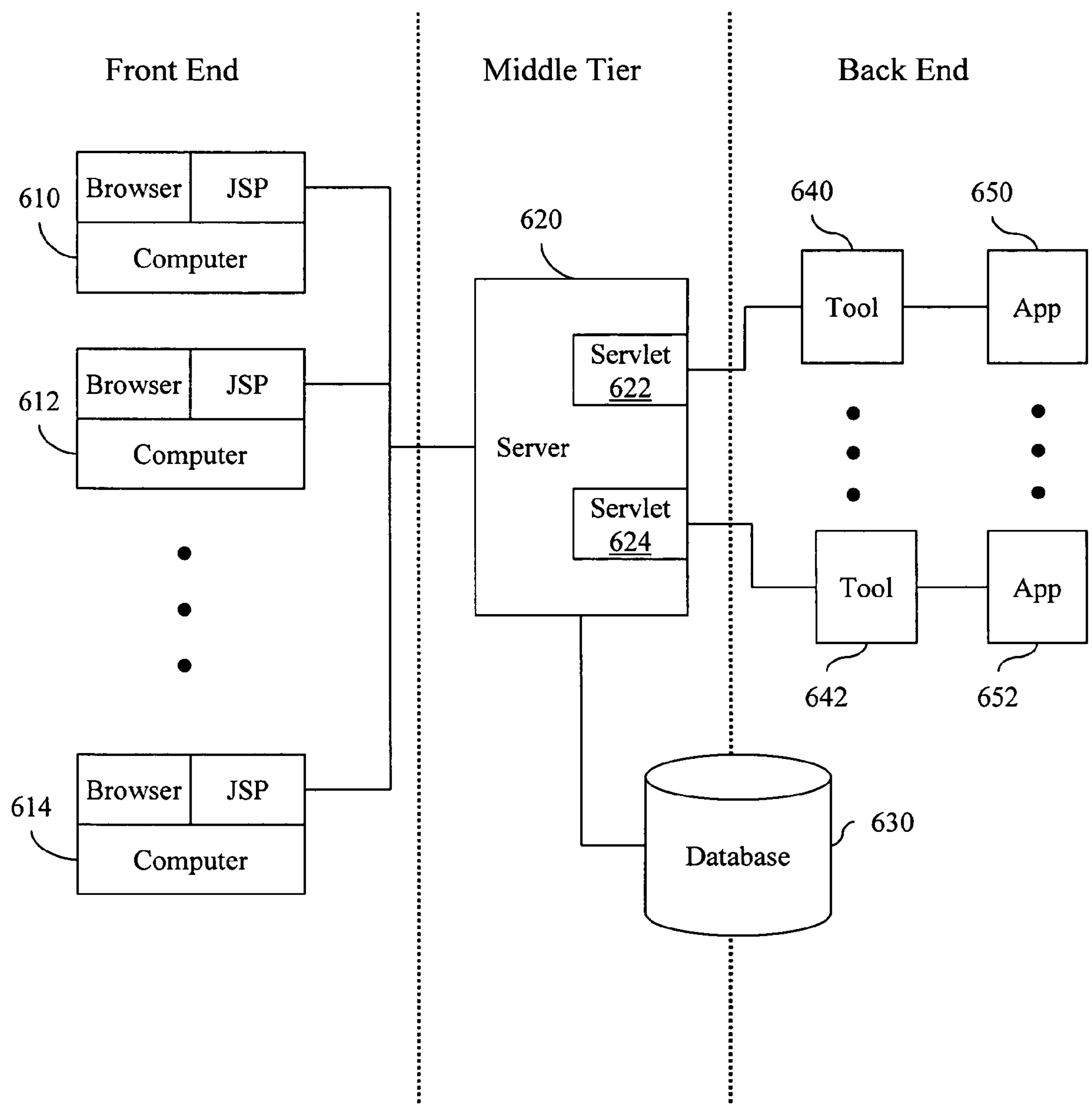
FIG. 6 illustrates an example configuration of distributed elements that may cooperate in browser based remote control of a functional testing tool.

FIG. 6 illustrates a multi-tiered architecture for supporting browser based remote control of a functional testing tool. The front end of the architecture includes clients 610, and 612 through 614. While three clients are illustrated, it is to be appreciated that a greater and/or lesser number of clients may participate in browser based remote control of functional testing. A client may include, for example, a browser and JSPs running on a computer.

The middle tier of the architecture may include a server 620. While a single server 620 is illustrated, it is to be appreciated that the middle tier may include more than one server and/or that server 620 may be distributed between more than one computer. Server 620 may include multiple servlets like servlet 622 and 624. Server 620 may be, for example, an Oracle 9iAS Web Server and may include an Apache servlet runner. Straddling the middle tier and the back end is database 630. Database 630 is illustrated straddling tiers because in some examples it may be located in the middle tier while in other examples it may be located in the back end or even in the front end.

The back end of the architecture may include functional testing tools 640 and 642. These functional testing tools may be configured to test applications like 650 and 652. While two test tools and two applications are illustrated, it is to be appreciated that a greater and/or lesser number of test tools and/or applications may be present. Furthermore, while a one to one relationship between a tool (e.g., 640) and an application (e.g., 650) is illustrated, it is to be appreciated that tools may have other relationships (e.g., one to many, many to one, many to many) with applications and that applications may have other relationships (e.g., one to many, many to many, many to one) with test tools. Additionally, while no relationship is illustrated between application 650 and application 652, it is to be appreciated that the applications may communicate and/or cooperate and thus functional test tools may be configured to functionally test these communicating and/or cooperating processes.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modem Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A computer-implemented method configured to run in a server, comprising:
receiving from a client a request to run a functional testing tool, the request being in the form of an HTTP method;
retrieving one or more parameters from the request, the one or more parameters being configured to facilitate identifying one or more of, a test script associated with the functional testing tool, a data store from which the test script may be retrieved, and an application to be tested by the functional testing tool;
providing the one or more parameters to a servlet configured to control the functional testing tool, the servlet being associated with the server;
selectively acquiring a test script configured to facilitate customizing an operation of the functional testing tool, the acquiring being performed by the servlet, the test script being stored as a binary large object (BLOB) in a database, the BLOB including a metadata configured to facilitate selecting a test script based, at least in part, on the one or more parameters;
causing a functional testing tool process to be created, the process being configured to functionally test the application, the causing being performed by the servlet; and
selectively controlling the functional testing tool process, the controlling being performed by the servlet.

2. The method of claim 1, the request being received from a browser via a Java Server Page (JSP) associated with the client.

3. The method of claim 1, including configuring the server with a servlet runner that is configured to listen for the request at a servlet port, the request being a servlet request.

4. The method of claim 1, the functional testing tool being a record and replay tool.

5. The method of claim 1, including selectively causing the test script to be provided to a data store associated with one or more of, the functional testing tool, and the application to be tested.

6. The method of claim 1, including selectively manipulating the one or more parameters from an HTTP format to a command line format associated with the functional testing tool.

7. The method of claim 1, where causing the functional testing tool process to be created includes invoking a servlet method via a servlet API, the servlet being a JAVA servlet.

8. The method of claim 7, where causing the functional testing tool process to be created includes processing a JAVA exec( ) instruction from the servlet.

9. The method of claim 8, where selectively controlling the functional testing tool process includes calling a JAVA service( ) method associated with the servlet.

10. A computer-readable medium storing processor executable instructions operable to perform the method of claim 1.

11. A computer-implemented method configured to run in a server, comprising:
receiving from a client a request to run a functional testing tool, the request being in the form of an HTTP method;
retrieving one or more parameters from the request, the one or more parameters being configured to facilitate identifying one or more of, a test script associated with the functional testing tool, a data store from which the test script may be retrieved, and an application to be tested by the functional testing tool;
providing the one or more parameters to a servlet configured to control the functional testing tool, the servlet being associated with the server;
selectively acquiring a test script configured to facilitate customizing an operation of the functional testing tool, the acquiring being performed by the servlet;
causing a functional testing tool process to be created, the process being configured to functionally test the application, the causing being performed by the servlet;
selectively controlling the functional testing tool process, the controlling being performed by the servlet; and
receiving an additional HTTP method from the client configured to terminate the functional testing tool process, causing the functional testing tool process to be terminated by providing one or more keystrokes to the functional testing tool process via a keystroke interface provided by an operating system supporting the functional testing tool process.

12. The method of claim 11, the keystroke interface being the pushkeys utility.

13. The method of claim 11, including upon detecting the completion of the functional testing tool process, selectively providing a result related to the functional testing tool process, the detecting and providing being performed by the servlet.

14. The method of claim 13, where selectively providing a result related to the functional testing tool process includes providing a binary large object (BLOB) to a results data store.

15. A computer-implemented method, comprising:
in a server;
configuring the server with a servlet runner configured to listen for the request at a servlet port, the request being a servlet request
receiving from a client a request to run a functional testing tool, the request being in the form of an HTTP method, the request being received from a browser via a Java Server Page associated with the client;
retrieving one or more parameters from the request, the one or more parameters being configured to facilitate identifying one or more of, a test script associated with the functional testing tool, a data store from which the test script may be retrieved, and an application to be tested by the functional testing tool;
providing the one or more parameters to a servlet configured to control the functional testing tool, the servlet being associated with the server;
selectively acquiring a test script that is configured to facilitate customizing an operation of the functional testing tool, the acquiring being performed by the servlet, the test script being stored as a binary large object (BLOB) in a database, the BLOB including a metadata configured to facilitate selecting a test script based, at least in part, on the one or more parameters;
causing a functional testing tool process to be created by invoking a servlet exec( ) method via a servlet API, the process being configured to functionally test the application, the causing being performed by the servlet, the servlet being a JAVA servlet;
selectively controlling the functional testing tool process by calling a JAVA service( ) method associated with the servlet, the controlling being performed by the servlet; and
upon detecting the completion of the functional testing tool process, selectively providing a binary large object to a results data store, the result being related to the functional testing tool process, the detecting and providing being performed by the servlet.

16. A system, comprising:

a server located on a first computer, the server comprising:

a servlet runner configured to listen at one or more servlet ports for an HTTP method requesting a run of a functional test tool against an application located on a second computer; and a servlet configured to cause the functional test tool to run, the servlet also being configured to selectively acquire an input data to provide to the functional test tool based, at least in part, on one or more parameters located in the HTTP method, the input data being stored as a binary large object (BLOB) in a database, the BLOB including a metadata configured to facilitate selecting a test script based, at least in part, on the one or more parameters; and a data store configured to store one or more input datas configured to control, at least in part, the functional test tool.

17. The system of claim 16, the server being configured to communicate with a browser configured to provide the HTTP method, the browser providing the HTTP method from a Java Server Page (JSP).

18. The system of claim 17, the server comprising an Oracle Web Server and the servlet comprising a Java servlet.

19. The system of claim 18, the input datas being stored as binary large objects (BLOBs) in an Oracle database.

20. The system of claim 19, including a second data store configured to store a result produced by one or more of, the functional testing tool, and the servlet.

21. The system of claim 20, the result being stored as a binary large object (BLOB).

22. A system, comprising:

means for selectively controlling a creation of a functional testing tool process to test software on a first remote machine;

means for storing on a second remote machine a set of data configured to facilitate customizing operation of the functional testing tool process with respect to the software; and means for selectively acquiring the set of data from a data store associated with the second remote machine and for providing the set of data to the functional testing tool process;

the set of data being stored in the data stare and provided to the functional testing tool process is a binary large object (BLOB) in a database, the BLOB including a metadata configured to facilitate selecting a test script.

* * * * *

UNITED STATES PATENT AND TRADEMARK OFFICE

CERTIFICATE OF CORRECTION

PATENT NO. : 7,543,188 B2
APPLICATION NO. : 11/169469
DATED : June 2, 2009
INVENTOR(S) : Devas et al.

It is certified that error appears in the above-identified patent and that said Letters Patent is hereby corrected as shown below:

In column 14, line 59, delete “Modem” and insert -- Modern --, therefor.

In column 16, line 30, in Claim 15, delete “server;” and insert -- server: --, therefor.

In column 16, line 33, in Claim 15, after “request” insert -- ; --.

In column 18, line 20, in Claim 22, delete “stare” and insert -- store --, therefor.0

Signed and Sealed this

Twenty-fifth Day of May, 2010

David J. Kappos
*Director of the United States Patent and Trademark Office*